United States Patent [19]  [11] 4,087,630
Browning et al.  [45] May 2, 1978

[54] CONTINUOUS SPEECH RECOGNITION APPARATUS

[75] Inventors: Iben Browning, Albuquerque, N. Mex.; Carl L. Berney, Sunnyvale, Calif.; Robert G. Chapman, Jr., New York, N.Y.; George Glaser, San Mateo, Calif.; John D. Madden, Sunnyvale, Calif.; L. John Postas, Santa Clara, Calif.

[73] Assignee: Centigram Corporation, Sunnyvale, Calif.

[21] Appl. No.: 796,191

[22] Filed: May 12, 1977

[51] Int. Cl.² .............................................. G10L 1/00
[52] U.S. Cl. ............................. 179/1 SD; 179/1 SA
[58] Field of Search .......... 179/1 SD; 340/146.3 WD

[56] References Cited

U.S. PATENT DOCUMENTS 3,770,892  11/1973  Clapper ............................. 179/1 SD
3,973,081  8/1976  Hutchins ........................... 179/1 SA Primary Examiner—Kathleen H. Claffy
Assistant Examiner—E. S. Kemeny
Attorney, Agent, or Firm—Boone, Schatzel, Hamrick & Knudsen

[57] ABSTRACT

An apparatus and method wherein speech or other signals are sampled during a time slice of approximately 1/30 second and spectrum analysis is performed on the samples, producing measures of amplitude in several frequency bands with each frequency band being characterized by a binary digit indicating the presence or absence of significant amplitude. The binary digits are collectively referred to as a sonogram. Sonograms for several time slices are then concatenated, randomized and decoded using an n-tuple technique to produce a pattern corresponding to the current speech signal. This pattern is learned by superimposing it on an existing vocabulary entry and is subsequently recognized if it is sufficiently similar to one vocabulary entry and different from all others.

18 Claims, 5 Drawing Figures

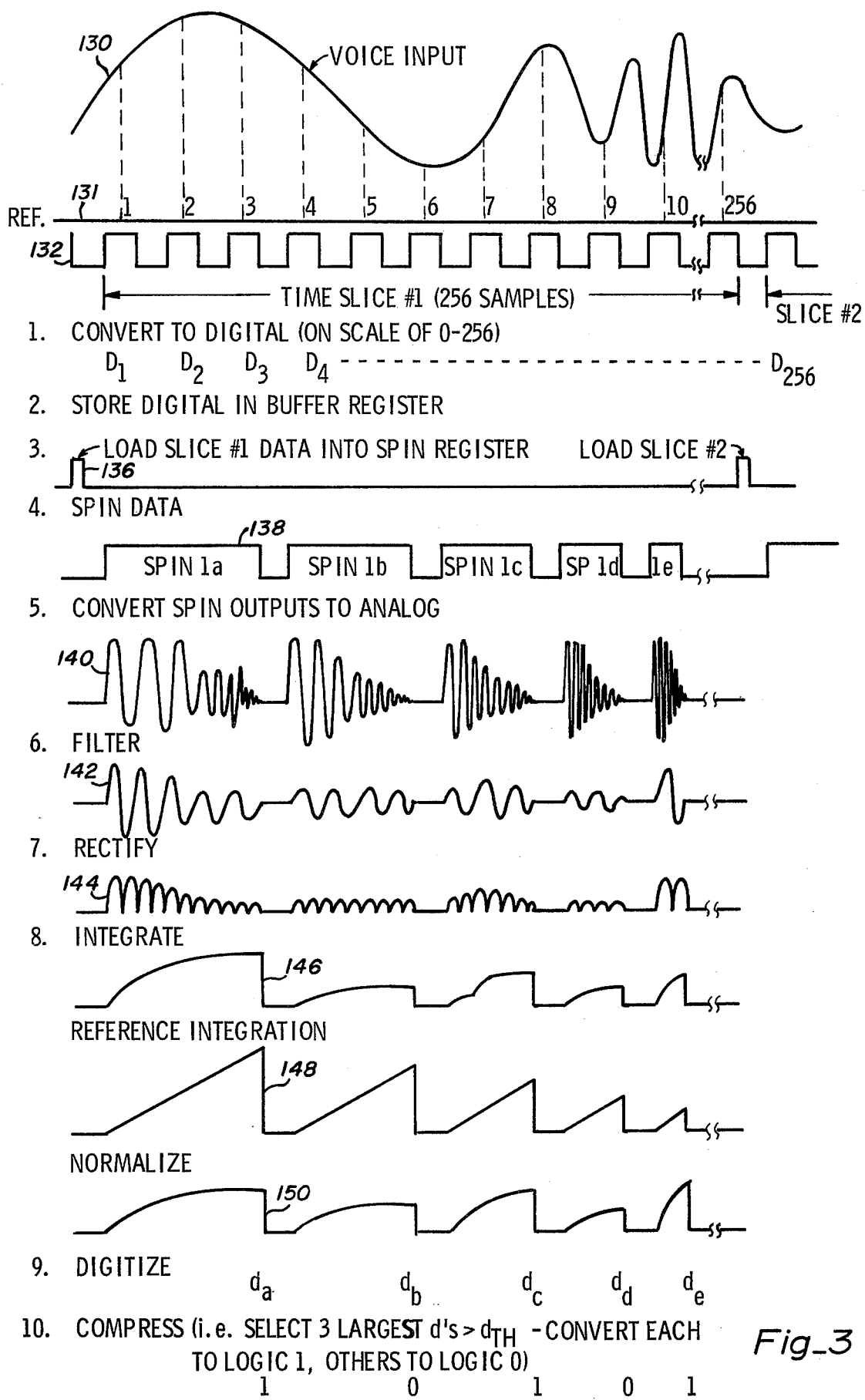
Fig_3

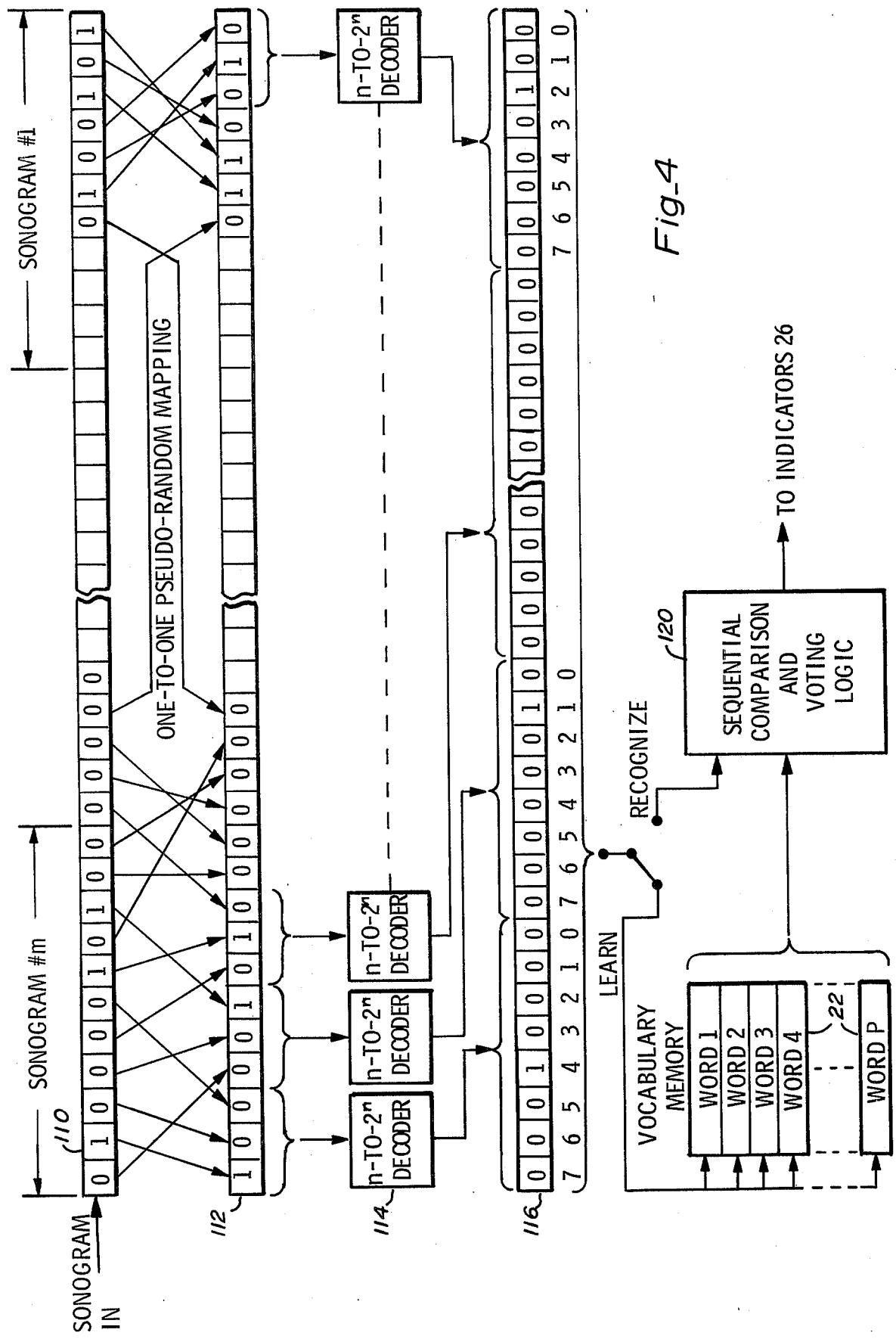
Fig_4

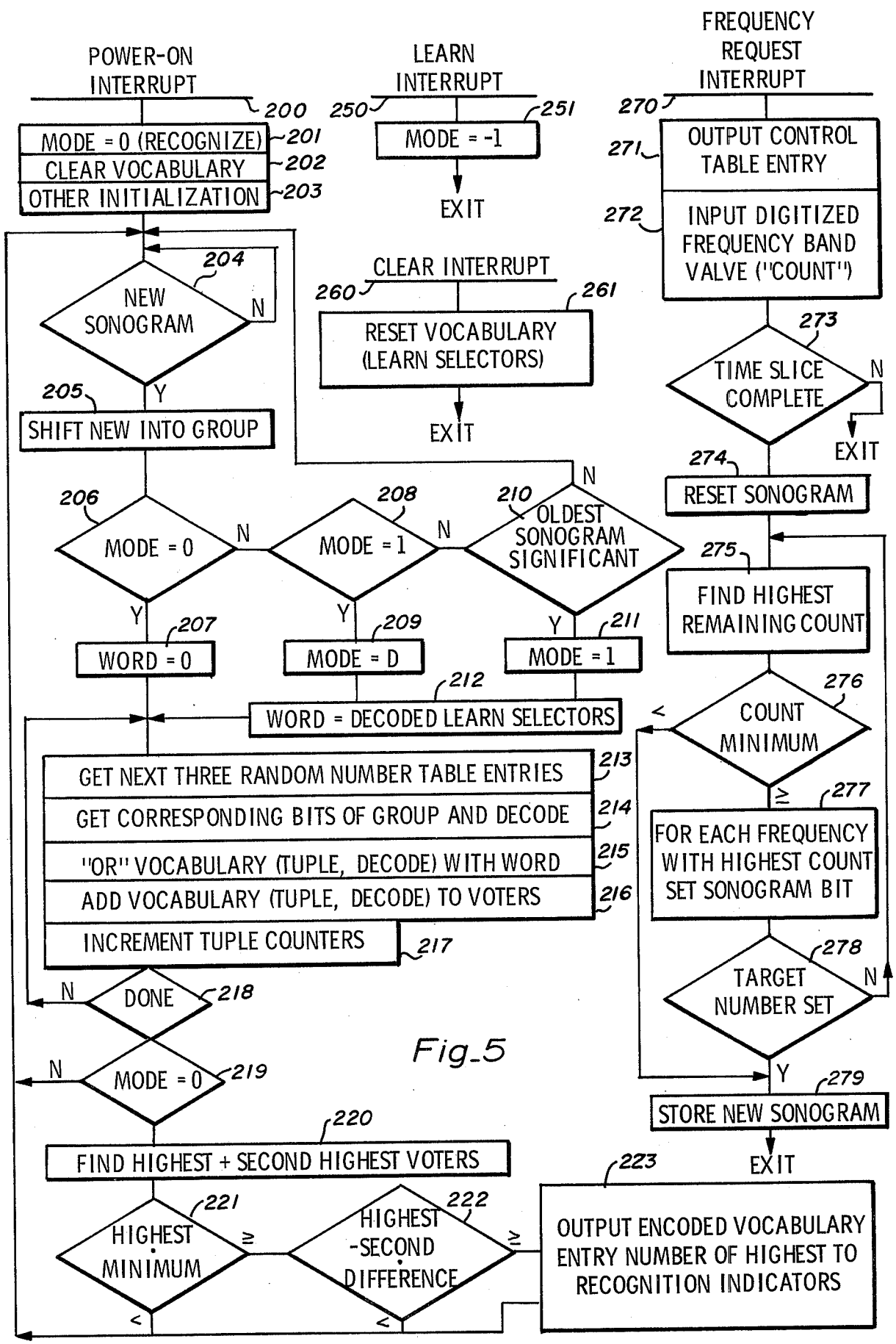
Fig_5

CONTINUOUS SPEECH RECOGNITION APPARATUS

BACKGROUND OF THE INVENTION

1. Field of the Invention

The present invention relates generally to waveform analysis apparatus and more specifically to a method and system capable of learning a vocabulary of spoken words and subsequently recognizing these words when they are spoken.

2. Description of the Prior Art

Research in speech recognition techniques has been underway for twenty years under both private and government auspices. Yet experts agree that little progress has been made beyond the techniques used in the early 1950's, when the first successful recognition system was demonstrated at the Bell Telephone Laboratories. The following is representative of the state of the art.

A method for speech identification, meaning either speaker identification or speech recognition, is disclosed in the U.S. Published Patent Application to Heribert J. P. Reitboeck, No. B 358,427. This system employs sophisticated frequency tracking techniques, including variable bandwidth and center frequency filters, to analyze speech formants for subsequent comparison. This method assumes that the waveform contains certain speech characteristics (pitch, formants, etc.) and requires time normalization.

A method for digital speech compression using a predictive feedback loop is disclosed in the U.S. Patent to Sandra E. Hutchins, U.S. Pat. No. 3,973,081. This patent is mentioned because part of the method employs n-tuples, although both the use of n-tuples and the purpose of the system are unrelated to the present invention.

A method using parallel bandpass filter to analyze speech waveforms is disclosed in the U.S. patent to Fausto Pozo, U.S. Pat. No. 3,737,580. In this technique the spectrum analysis results are simply added for the purpose of speaker identification or authentication.

Another system, designed primarily for programmers who are severely disabled, is capable of storing approximately fifty words which can be recognized by the system. After being "trained," a voice input of any of the words is input to the system through a microphone and the signal is passed through a spectrum analyzer that consists of a number of bandpass filters covering the audio spectrum from roughly 200 Hz to 5,000 Hz. The screened output from these filters is then fed through a multiplexer to an analog-to-digital converter so that the energy values are converted to an 8-bit code which is used to indicate word recognition. Aside from the fact that the machine is quite expensive, it requires a pause between each word, thus imposing a limitation on the use of system which is undesirable for certain applications.

A device that requires no pause between each word, but that is limited to a 5- or 10-second continuous stream of input signals, or to an indefinite continuous stream with a limited number of words in its vocabulary, i.e., approximately 35 words, is described in the August 1976 issue of *Datamation*, pp. 65–68. This type of device is likewise limited in application and is relatively complicated and expensive.

SUMMARY OF THE INVENTION

The present invention is unique in that it employs techniques fundamentally different from those used in traditional approaches to speech recognition, it lends itself to limited vocabulary applications, and it lends itself to utilization of recent technological advances in large-scale integration of electronic devices.

The present invention is further unique in that it embodies the combination of two previously unrelated techniques, frequency spectrum analysis and n-tuple pattern recognition, linked by data reduction of the digital frequency spectrum analysis results to a binay sonogram. This combination produces a limited capability low-cost speech recognition system.

In accordance with the present invention, an input speech signal is sampled continuously at a rate higher than the highest frequency of interest. During each time slice of approximately 1/30 second, spectrum analysis is performed on the samples, producig measures of amplitude in several frequency bands. The presence or absence of significant amplitude in the frequency bands is indicated by corresponding binary digits, collectively referred to as a sonogram. Sonograms for several time slices are then concatenated, randomized, and decoded, producing a pattern for the current window of speech signal. This pattern may be "learned" by superimposing it on an existing vocabulary entry, or recognition may be attempted, with recognition indicated if the current pattern is sufficiently similar to one vocabulary entry and different from all others.

Important characteristics of the present invention are that it uses an n-tuple process of pattern recognition in developing both the stored vocabulary and the input signal data for comparison thereto; and that except for the general range of frequencies considered to be of interest, it does not assume prior knowledge about either the specific words spoken or the language in which they are spoken.

Important features of the present invention are that it utilizes sampling and comparison techniques which can be implemented in either a hard-wired configuration or through a hybrid combination of hard-wired equipment and computer software; that it operates in real time; that it is not limited to words spoken in isolation, but can recognize words embedded in continuous speech; that it can recognize words spoken by persons other than the person(s) who trained the device; and that it has a high recognition rate on words it has learned and a high rejection rate on words it has not learned.

IN THE DRAWING

FIG. 3 is a diagram illustrating various functional and operational steps undertaken in processing data in accordance with the present invention;

FIG. 4 is a diagram generally illustrating various functional steps undertaken in processing data in accordance with the present invention; and FIG. 5 is a logic flow chart illustrating various operational steps undertaken in processing data in accordance with the present invention.

DETAILED DESCRIPTION OF THE PREFERRED EMBODIMENT

Figure 1:
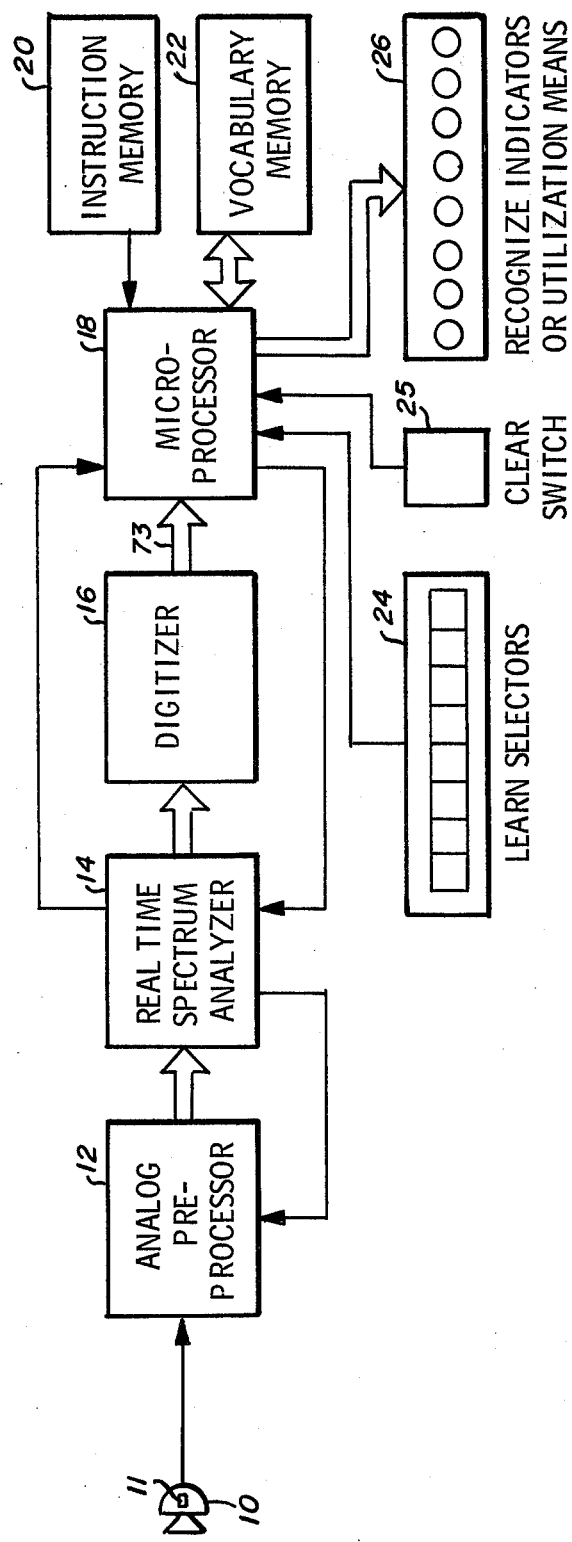
FIG. 1 is a block diagram illustrating the principal operative components of a speech recognition system in accordance with the present invention.

As illustrated in the accompanying drawing, the present invention provides a means for storing a vocabulary of words in an encoded form and then recognizing spoken words included within the previously stored vocabulary. In order to accomplish this, one or more "time slices" of input audio are analyzed for their frequency content and are reduced to a binary representation of the energy contained within a plurality of frequency bands. The binary representation is then processed using an n-tuple pattern generation technique and the resulting pattern is compared to each of the vocabulary entries. The "closeness of fit" of each coparison is analyzed with respect to certain criteria and a pattern showing sufficient closeness is identified as being recognized. A detailed discussion of an n-tuple process is disclosed in an article by W. W. Bledsoe and I. Browning entitled "Pattern Recognition and Reading by Machine," appearing in the 1959 Proceedings of the Eastern Joint Computer Conference.

In accordance with the present invention a plurality of discrete segments of speech are processed in three dimensions; namely, time, frequency and amplitude. More specifically, the frequency band amplitudes for a given time interval of input speech are reduced to a binary (black/white) representation and a number of the binary representations are concatenated for the number of time intervals which comprise the speech segment of interest. These several representations then constitute the information which is processed using an n-tuple pattern recognition technique wherein a current pattern corresponding to an input voice signal is compared to a group of stored patterns which constitute the vocabulary of the device. If the criteria of the comparison algorithm are satisfied, the recognized speech segment is identified.

The illustrated preferred embodiment may be thought of as performing three principal functional operations; namely, frequency selection, pattern generation and pattern recognition. During the frequency selection operation, the audio signal input for recognition is sampled, digitized and reduced to a string of binary digits each of which indicates the presence or absence of significant amplitude in one of the frequency bands during the current time interval. During the pattern generation operation, the strings of binary digits which represent the several time intervals comprising the sliding window of sound are accumulated and transformed using the n-tuple algorithm. During the pattern recognition operation, the resulting n-tuple pattern is individually compared to each of the stored patterns which comprise speech segment vocabulary. Certain recognition criteria are then applied to the result of each comparison and if the criteria are satisfied, the recognized speech segment is identified.

The frequency selection portion of the apparatus includes a real-time spectrum analyzer which determines the amount of signal energy present in each frequency band of interest and a data compressor for reducing the output of the spectrum to a string of binary bits. The analyzer performs a frequency domain transform of the input analog signal into a series of numbers, each of which is a measure of the amount of signal energy present in a particular frequency band. The analyzer operates on a time slice basis wherein the frequency components for a particular time slice of the input signal are being determined while the data for the next time slice is being accumulated. The dual-rank operation of processing during accumulation provides the real-time aspect of the spectrum analyzer.

Referring now to FIG. 1 of the drawing, there is shown a block diagram illustrating the principal operative components of the present invention. An audio frequency microphone 10 serves as the transducing means for converting audio frequency sound to an electrical signal which is fed into an analog preprocessor 12. Microphone 10 includes a switch 11 which in one position causes the apparatus to operate in the "learn" mode and in a second position causes the apparatus to operate in a "recognize" mode. Preprocessor 12 divides the input analog signal into time slices, converts each slice into digital form and stores the digital information until it is input to a spectrum analyzer 14. When the data is input to analyzer 14, it is in effect sequentially filtered over a number of frequency bands of interest to develop an analog output signal that is indicative of the spectral energy contained in the input slice for each frequency band of interest. The analog data is then intput into a digitizer 16 that converts the analog signals into digital signals which are then processed by a microprocessor 18 using compression and n-tuple algorithms stored in its memory 20. Depending upon whether the apparatus is being operated in the learn mode or the recognize mode, the microprocessor will either cause the processed data to be stored in a vocabulary memory 22 or be compared to each of the "words" stored in the memory 22.

In the illustrated embodiment, a plurality of learn selector buttons 24 are provided which when depressed cause a particular storage site in memory 22 to be addressed to receive an encoded word during the learn mode. A clear switch 25 is provided which, when depressed, causes the addressed word in memory 22 to be cleared. A plurality of recognition indicators 26 are also provided to indicate that an input word is recognized when the apparatus is being operated in the recognize mode. Alternatively, any suitable utilization means could be substituted for or used in addition to the bank of indicators so as to enable a verbal instruction to initiate a responsive operation.

Figure 2:
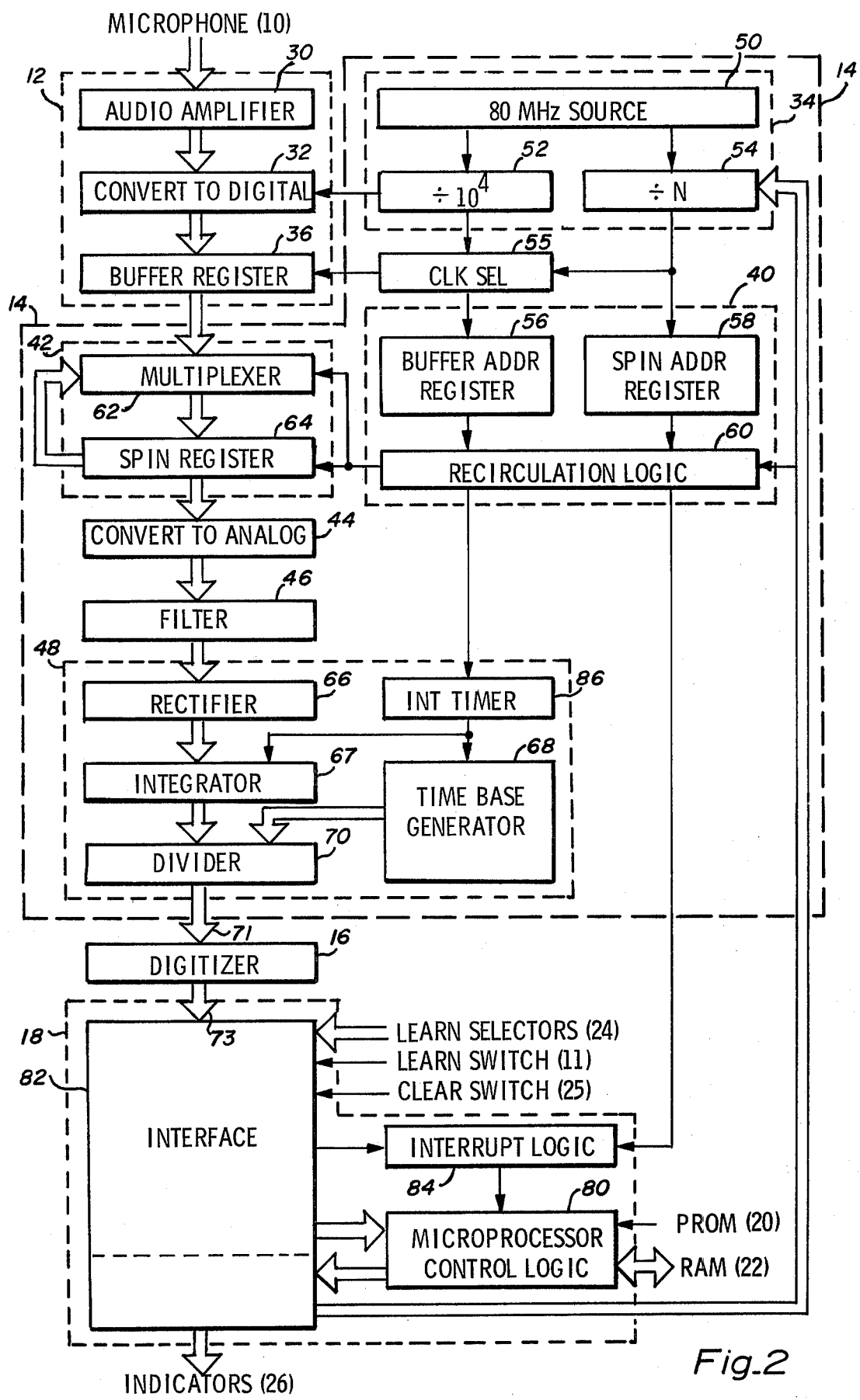
FIG. 2 is a block diagram further illustrating several of the components shown in FIG. 1 of the drawing.

In FIG. 2 of the drawing the principal operative components of the present invention are illustrated: the preprocessor 12, the spectrum analyzer 14, the digitizer 16 and the microprocessor 18.

Preprocessor 12 includes an audio amplifier 30 which receives the input voice from microphone 10 and amplifies it to a level suitable for use by the system. Amplifier 30 also includes an automatic gain control circuit (not shown).

The signal from the input amplifier are digitized by the analog-to-digital converter (ADC) 32 at a fixed rate determined by a clock signal source 34 which is a part of the analyzer 14, and the resulting samples are placed in a buffer shift register 36 at a rate which is chosen to be at least twice that of the highest frequency of interest for the spectrum analyzer. The length of the register 36 is determined by the number of samples generated by ADC 32 for the duration of a time slice. The width of the shift register is commensurate with the number of bits of resolution of the ADC. In the preferred embodiment, an 8-kHz clock is used to cause 256 samples to be taken during each 32-msec.time slice. Each digital output generated by ADC 32 is in the form of an 8-bit word representing the amplitude of the input signal at a particular instant.

When register 36 becomes full, its contents are transferred into the analyzer 14. During accumulation, the shift rate of register 36 is the same as the conversion rate of ADC 32. However, when the transfer to the analyzer 14 takes place, the shift rate is increased to the same rate as the spin register through the clock select 55 so that the entire contents of the shift register are transferred to the analyzer in less than one conversion time of the ADC. This insures that the input signal is digitized continuously and that no samples are lost.

In addition to the clock 34, the analyzer 14 includes control circuitry 40, a variable rate recirculating device or spinner 42, a digital-to-analog converter (DAC) 44, a bandpass filter 46 and an averaging circuit 48.

Clock 34 includes an oscillator 50 which generates the basic clock signals for the device, a divider 52 which divides the basic clock frequency to provide clock signals for driving ADC 32 and buffer register 36, and a variable divider 54 which is controlled by microprocessor 18 and causes the basic clock signal to be divided by selected divisors to provide clock signals which are used by control circuitry 40 to control the rate at which spinner 42 recirculates the data contained therein.

The analyzer control unit 40 includes a buffer address register 56 and a spin address register 58, both of which keep track of the number of clock pulses applied to each of the shift registers (36 and 64) to determine when their contents have been completely shifted through, and recirculation logic 60 which responds to the signals developed by the address registers and inputs received from microprocessor 18 to develop signals for controlling operation of spinner 42 and averaging circuit 48.

The spinner 42 includes an 8-bit multiplexer 62 and a spin register 64. The multiplexer 62 is controlled by the output of control circuitry 40 and alternatively inputs the output of buffer register 36 into register 64 or recirculates the output of register 64 back into its input. Spin register 64 is a digital shift register having a length equal to some preselected integer multiple of the length of the buffer register 36 and its width is the same as that of register 36. When multiplexer 62 is in its load configuration, the output of register 36 is shifted into register 64, replacing a portion of the data previously contained therein.

When the contents of the buffer 36 have been transferred, multiplexer 62 is switched to its recirculate mode and the data contained therein is recirculated a number of times, e.g., 11 in the preferred embodiment with each spin being at a rate such that the frequency of interest for a particular band will be increased to match the center frequency of the bandpass filter 46. The total time required to accomplish all 11 spins for a given register load is less than the time required to fill the input buffer 36 with an equivalent number of bits of data. During each spin, the contents of register 64 are also fed into the DAC 44 which in response generates an analog signal. This is essentially a time compressed duplicate of a segment of the input audio signal.

At the end of each spin, register 64 is stopped for a predetermined period of time with the first sample of the next spin being positioned at the input to the converter 44. This delay allows the filter 46 to settle to zero so that there are no residual effects from the current spin introduced into the following spin. Stopping the shift register on the first sample of the next spin assures that no frequency components will be introduced by the step function which occurs between the last sample of the current spin and the first sample of the next spin.

Filter 46 is a multiple pole bandpass filter, e.g., a 6-pole Chebyshev, the center frequency of which is chosen as a function of the speedup ratio for the spin rate such that all spins are completed during the interval of one time slice. The bandwidth of the filter is proportional to the spacing between adjacent frequency bands. The frequency bands are spaced logarithmically over the desired frequency range $f_{low}$ to $f_{hi}$. For $n$ frequencies $f_n = (f_{hi} - f_{low})^{1/n} f_{n-1}$ where $(f_{hi} - f_{low})^{1/n}$ is the "spacing factor." This spacing factor determines the bandwidth of the filter 46. The input signals to filter 46 are the analog signals developed by converter 44 during each spin of spinner 42 for a given time slice. These signals contain frequency components corresponding to all those present in the input time slice, the only difference being that each component is shifted up in frequency relative to its correspondent in the input audio. The signal output from filter 46 is an analog signal having a frequency at the center frequency of the filter and an amplitude that is proportional to the amplitudes of the signal components within the pass band of the filter. It will thus be appreciated that the operative effect of the variable spinner/single filter is to sequentially determine the spectral frequency constituency of the input time slice or slices. In the present invention this spectral determination is made on the basis of 11 bands within a particular audio range, e.g. 300 Hz to 3,000 Hz.

The averaging circuit 48 includes a rectifier 66 which rectifies the output of filter 46, integrator 67 which integrates the rectified signals, a time base generator 68, which generates a voltage proportional to the time of each spin, and a divider 70 which divides the integrated spin signals by the time base signal to provide a normalizing effect on the several spin signals. In other words, the averaging circuit 48 integrates the output of filter 46 over the period of each spin and normalizes this output with respect to the spin period.

The normalization operation is required due to the differences in spin period of the several spins of each time slice, i.e., the low frequency bands have a short spin period while the high frequency bands have a longer spin period. This is to say that given an equal amount of signal at both a low frequency and a high frequency, the output of a simple integrator will give a larger signal for the higher frequency than for the lower frequency, since the spin, and thus the integration period, is longer at the high frequency than it is at the lower frequency.

The output of integrator 67 provides a signal which is proportional to the integral of the frequency component present in the current band and such signal is fed into the numerator of the divider 70. The time base voltage 68 is an output which is proportional to the spin period and which is fed into the denominator of the divider 70. Both integrators operate over the entire spin period and are simultaneously put into hold at the end of each spin. The signal at the divider output is thus a true average of the filter output over the spin period. The outputs of both integrators are reset to zero prior to the next spin period.

The output of averager 48 is fed into a digitizer 16 which consits of an ADC that at the end of each spin converts the analog voltage at the averager output to a number which is a measure of the signal energy in one of the 11 frequency bands of interest. More specifically, the averager output is digitized at the end of each spin so that a set of binary numbers, i.e., one 6-bit number for each of the 11 frequency bands, is generated for each time slice or group of time slices contained in spinner 42. This set of numbers, which indicates the relative signal energy in each of the 11 frequency bands, is then passed to the microprocessor 18 which contains logic that generates a single binary digit for each of the 11 binary numbers input thereto during the period of one input time slice. Each set of 11 numbers is analyzed for significance using two criteria; namely, minimum threshold value and target number of significant frequency bands. Conceptually, the 11 frequency band amplitude values exceeding the minimum threshold are ranked by value and a corresponding binary digit is set to logic 1, starting with all frequencies having the highest value, until the target number is achieved or exceeded, or until the highest remaining value is less than the minimum threshold. Each 11-bit string is called a sonogram.

At the end of each spin period a fixed delay is generated by the integrator timing means 86. During the first part of the delay the integrator outputs in the averager are held for the duration of the conversion time of digitizer 16. The integrators are then reset for the duration of the delay to allow for the rest of the filter settling time. During the delay period, the microprocessor 18 outputs a new frequency divisor to 54. At the end of the delay period the spinner shifts at the new clock rate to effect the next spin. After the last spin for a particular time slice, the delay is extended to wait for the input buffer 36 to fill. The contents of the buffer are then transferred to the spinner through the multiplexer 62. A post spin delay interval is also generated to allow filter 46 to settle out transients generated by the transfer operation. No meaningful data is generated by the filter or averager during the transfer operation.

Microprocessor 18 (an Intel 8080A) includes control logic 80 interface circuitry 82 and interrupt logic 84. The logic 80 is programmed to function in accordance with the various instructions stored in memory 20 so as to cause the various components of the apparatus to operate in the proper order and to perform the various manipulations of the data required to carry out the storage of vocabulary during operation in the learn mode, and the comparison and evaluation of data during operation in the recognize mode. The interface circuitry 82 serves to facilitate the interchange of data between the microprocessor, analyzer, memories and external components. The interrupt logic senses the occurrence of the activation of the learn switch 11, the end of spin cycle from 60 requiring a new frequency divisor, or the activation of the clear button 25 on the learn selector panel 24, each of which causes the microprocessor to effect a particular control sequence in response.

Referring now to FIG. 3, an overview of the operation of the circuit illustrated in FIGS. 1 and 2 will be given to illustrate the operation thereof. At 130 there is shown a segment of analog audio signal of the type which might be input to preprocessor 12 through the microphone 10. At 132 the clock pulses generated by clock 34 for input to converter 32 and buffer 36 are illustrated. As indicated, 256 clock pulses are identified as defining one time slice, and for each clock pulse of the train 132 a sample of the audio input signal is taken and converted to a digital value proportional to the signal amplitude. These digital values are represented as $D_1, D_2, \ldots D_{256}$. In the present invention the digital numbers D have a range between 0 and 255, and are in the form of an 8-bit binary number. Immediately after generation, each of these numbers is stored in the buffer 36.

After the information in one time slice is loaded into buffer 36, a load signal 136 is generated by analyzer control circuitry 40 during the pulse interval following the 256th timing pulse of a particular time slice, and all of the data contained in buffer register 36 is quickly loaded through multiplexer 62 into spin register 64 in a time less than one clock interval. Register 36 is then refilled with data from the next time slice. During the time that register 36 is being refilled, the data contained within register 64 is recirculated at different rates to generate the spin data mentioned above. In the present invention the data is recirculated 11 times with the spin rate of the first recirculation being selected to shift the frequency of interest up to the center frequency of the filter. The center frequency of filter 46 was chosen as 65 kHz so that 11 spins can be accomplished in 1/30 of a second to analyze the frequencies between 300 Hz and 3,000 Hz. The spin periods of the several spins are illustrated at 138.

Converter 44 converts each of the digital numbers making up the 256 samples of each time slice into analog signals, as illustrated at 140, and these signals are then passed through filter 46 which allows the 65 kHz component of each signal as illustrated at 142 to pass into rectifier 66. Rectifier 66 then performs a full wave rectification of the signals and develops an output such as that illustrated at 144. The rectified output is integrated by integrator 67 to develop an output such as that illustrated at 146, and the result is divided by the time base reference signal 148 generated by generator 68 so as to produce a normalized output on line 71 of FIG. 2 which resembles that illustrated at 150. The normalized output is then converted by digitizer 16 to develop digital output signals "d" on line 73.

In the preferred embodiment, 6-bit numbers "d" are output by digitizer 16, with each number representing the energy content of one of the 11 frequencies of interest in each time slice or group of time slices. Data compression, as further explained below, is then performed by microprocessor 18 and sonogram bits are set to a logical one for frequency bands with significant information.

Turning now to FIG. 4 of the drawing, the pattern generation and pattern recognition operations in accordance with the present invention are schematically illustrated.

In this diagram a series-to-parallel shift register 110 is shown having the capacity of storing up to $11 \times m$ bits of data corresponding to m sonograms, where $m = 11$ in the present invention. A second $11 \times m$ bit register 112 is also shown which is a parallel-to-parallel device having its input side coupled in pseudo-random fashion to the output side of register 110. The output side of register 112 is functionally divided into x-bit increments, e.g., in the present invention $x = 3$, and each x-bit increment is connected for output to an n-to-$2^n$ decoder 114. Each decoder 114 converts the corresponding x-bit value n in register 112 to a $2^n$ number wherein only the bit corresponding to the value n is set to a one. The resulting number is loaded into a third register 116. This process of data transformation is referred to as an n-tuple pattern generation process. When the apparatus is operated in the learn mode, the data contained in the register 116 is superimposed onto one word of vocabulary memory capable of containing up to P words, where $P = 8$ in the present invention. During the recognize mode the data contained in register 116 is sequentially compared on a bit-by-bit basis to the word patterns contained in the vocabulary memory 22. Comparison consists of counting the number of one-one bit pairs. The resulting counts are then analyzed to determine the two highest counts. If the highest count satisfies a minimum value criteria and if the difference between the two highest counts satisfies a minimum difference criteria, then a sufficient match has been found between register 116 and the word pattern of memory 22 having the highest count. In this case an output will be generated by logic unit 120 to actuate the appropriate indicator 26.

The learn mode is entered when the microphone switch 11 is toggled. When in the learn mode and when the oldest sonogram of the voice print has a parameterized number of bits set, then the leading edge of a word to be learned has been detected and the current pattern is OR'd into the vocabulary storage for one of the eight possible commands as determined by the control panel selector switches 24. This process is repeated during the next time slice. This is to say that the pattern generated by the addition of a new time slice and the deletion of an old time slice, i.e., one time slice shift in spinner 42, is added to the vocabulary storage over the previously stored pattern so as to broaden the recognition capability of the device. Following this second storage operation the system reverts to the recognize mode.

FIG. 5 of the drawing schematically illustrates the implemented structure of the microprocessor software (ref. 20 of FIG. 1) of the present invention.

This software provides five primary functions: first, when prompted by a frequency request interrupt, an entry from a table of constants is output for variable clock (ref. 54 of FIG. 2) and recirculation logic (ref. 60 of FIG. 2) control. Second, during each time slice the digitized frequency band values (ref. 73 of FIG. 2) are collected and from them a sonogram for the time slice is constructed. Third, sonograms for several time slices are concatenated and transformed into the pattern to be learned or recognized using the $n$-tuple technique. Fourth, the learn capability is provided. Fifth, the selective recognition capability is provided, with output to the recognition indicators (ref. 26 of FIG. 2).

The software is partitioned into four separates but interdependent interrupt handlers. The power-on interrupt occurs only once, and causes the software to perform one-time initialization and start execution of the background task. This task is in execution unless one of the other interrupts is being serviced. The background task is driven by data from the frequency request interrupt handler, and is controlled by that interrupt and the learn interrupt. The clear interrupt handler is completely independent of the background task and the other interrupt handlers.

Referring now to FIGS. 2, 4 and 5, when the power-on interrupt 200 occurs, a one-time initialization indicated at 201, 202, 203 is performed. In particular, recognize mode is set (201) and the vocabulary memory 22 is cleared (202). Then the test for a new sonogram (204) is repeatedly executed, until a new sonogram is made available (279) by the frequency request interrupt handler. Then the new sonogram is shifted (205) into the sonogram group (shown as 110 in FIG. 4), with the oldest sonogram being discarded. Next, the learn-/recognize control is set up at 206 through 212. Initially the system is in recognize mode, determined by the mode test 206, so a variable called "word" is set to zero (207). In the learn mode, a "word" will be the decoded (212) value of the learn selectors 24. This is done so that no mode test is required in the following time-consuming loop 213 through 218.

Next, most of the pattern generation, comparison and voting shown conceptually by FIG. 4 is accomplished. While FIG. 4 schematically shows this processing as being done in a parallel manner, in act it is done serially, with each 3-bit group (called a "tuple") of registers 112 being decoded by decoders 114 to generate part of the pattern 116 and is then either learned or compared by logic 120 with the vocabulary memory 22. This process is driven by a table of random numbers (not shown) and the number of tuples, and results in a comparison count ("voter") for each vocabulary entry.

First, the voters, the tuple counter and the random number table index are reset (not shown). Then the random number tale is accessed sequentially as shown at 213 to determine the sonogram group bits at 214 which constitute the next 3-tuple of 112. This tuple is decoded at 214 (also 114 and 116 in FIG. 4). At 215 the vocabulary data for all eight entries for the decoded value of the current tuple is combined with the "word" mentioned above and replaced in the memory 22. Then these eight bits are separately added (216) to the eight voters for the eight entries. The tuple counter is incremented (217) and tested (218), and the loop is repeated until all tuples have been processed. The mode is then again tested at 219, and if learning, the recogniation logic 220 through 223 is bypassed to save time, by returning to 204. At 220 the voters for each entry are examined, and the highest and second highest (possibly equal) voters are determined. If the highest satisfies a minimum criterion (221) and if the difference between the highest and second highest satisfies a difference criterion (222), the number of the vocabulary entry with the highest voter is output (223) to the recognition indicators 26. In any case, the software returns to 204 to wait for another sonogram.

Meanwhile, frequency request interrupts (270) have been occurring. A control table entry is output (271) and the digitized frequency band value ("count") is input (272). If all the counts for a time slice have been accumulated (273), they are converted to a sonogram (274 through 279). The sonogram is cleared (274). Then for the highest counts (275) above a minimum (276) bits are set in the sonogram (277) until a target number of bits (278) are set or all remaining counts are below the minimum (276). Then the sonogram is stored (279) for access by the background task when it is ready.

The learn sequence is started by a learn interrupt (250), asynchronous from the background task. It causes (251) the mode to be set to $-1$, indicating a "wait to learn" mode. The background task will simply accept sonograms (204, 205, 206, 208, 210, 204, etc.) until the leading edge of the word to be learned is detected, indicated (210) by a significant number of bits set in the oldest sonogram of the sonogram group. At this time (211) the mode is changed to 1 and the first learn cycle is performed (212 through 219). A second and final learn cycle is provided by 208, 209 and 212 which detect the previous learn cycle, set recognition mode and setup the learn "word". Thus, on this last cycle, both learn and recognize are performed.

The clear interrupt 260 can be generated by 25 to clear a vocabulary entry 261 as determined by the learn selectors 24.

In summary, the system looks at a sliding window of sound approximately ½-second wide with the audio signal being continuous with respect to both frequency and time. The hardware reduces this information to a gray scale with 6-bit resolution which is discrete with respect to both frequency (11 bands) and time (11 slices). The software further reduces this information to a black/white or binary characterization using the same number of frequency bands and time slices. This string of bits is then learned/recognized using an $n$-tuple pattern recognition technique. The current implementation uses a 3-tuple algorithm, but a 2-tuple algorithm has been used and a 4-tuple algorithm may be used and a 4-tuple algorithm may be used. A larger order of tuple requires less processing time but more learning experiences and more vocabulary storage space. It is the $n$-tuple technique which allows the system to learn the same words spoken by different voices; to learn the same words spoken in different languages; to learn synonomous words, etc. The speed of this technique allows real time recognition; and the learning of words spoken by different people increases the likelihood of correctly recognizing words spoken by someone who has not trained the system.

Although described above in terms of a particular generalized and simplified embodiment, it is contemplated that alternative embodiments could be provided which would differ in gross characteristics such as the number of vocabulary words, the absence of an interactive learning feature, and various tradeoffs for cost/performance reasons.

Furthermore, it is contemplated that the subject invention may also be used to monitor and recognize certain signal patterns generated by various medical instruments, radar or sonar devices, electronic scanning microscope or telescope apparatus or any other devices which generate an electrical signal, the characteristics of which correspond to a particular phenomenon or event to be recognized.

It is further contemplated that other alterations and modifications of the present invention may also become apparent to those skilled in the art after having read the above disclosure. Accordingly, it is intended that the appended claims be interpreted as covering all such other embodiments, alterations and modifications as fall within the true spirit and scope of the invention.

What is claimed is:

1. Speech recognition apparatus capable of operating in either a learn mode or a recognize mode comprising:
    means for converting audible speech into an electrical signal;
    signal processing means for sampling a time slice of said electrical signal and for developing a plurality of digital signals representative thereof;
        spectrum analyzing means for receiving said plurality of digital signals and for developing a series of frequency component signals each of which is indicative of the amplitude of a particular frequency component in said time slice;
    means for converting said series of frequency component signals into a series of binary digits respectively indicating the presence or absence of significant amplitude in each said frequency component signal;
    means for pseudo-randomly selecting various ones of said binary digits from a plurality of concatenated series of said digits and for combining the selected binary digits into groups of $n$ data bits, where $n$ is an integer;
    means for decoding each of said groups of $n$ bits to develop a corresponding binary word of length $2^n$;
    means for storing said binary word when said apparatus is operated in the learn mode; and
    means for comparing words developed from subsequently input speech to each of said stored words, and for developing an output signal when a predetermined correlation is found to exist between the compared input word and a particular stored word, such output signal indicating that said subsequently input speech has been recognized.

2. Speech recognition apparatus as recited in claim 1 wherein said electrical signal is in the form of an analog signal and said signal processing means includes an analog-to-digital converter which periodically samples said analog signal and develops digital signals corresponding to the amplitude of each analog signal sample, and buffer means for storing each said digital signal in a time slice.

3. Speech recognition apparatus as recited in claim 2 wherein said spectrum analyzing means includes means for receiving the digital signals stored in said buffer means and corresponding to a first time slice, and for repetitively outputting such signals at predetermined different rates during the time that digital signals from a second time slice are being loaded into said buffer means; digital-to-analog means for converting each of said time-shifted digital signals to corresponding analog signals; and bandpass filter means for filtering out a particular frequency component from each of said analog signals to develop said series of frequency component signals.

4. Speech recognition apparatus as recited in claim 3 wherein said means for receiving and repetitively outputting said digital signals at predetermined rates includes a variable output rate shift register having recirculating circuit means coupling its output to its input.

5. Speech recognition apparatus as recited in claim 3 wherein said spectrum analyzing means further includes averaging circuit means for normalizing said component frequency signals.

6. Speech recognition apparatus as recited in claim 5 wherein said averaging circuit means includes a rectifier means for rectifying the output of said filter means, an integrating circuit for integrating the rectified signals, means for generating time base signals, and means for dividing the integrated signals by the time base signals to develop said frequency component signals.

7. Speech recognition apparatus as recited in claim 3 wherein said means for converting said series of frequency component signals includes an analog-to-binary digital converter which develops a series of binary numbers, each of which is representative of the amplitude of one of said frequency component signals, and means for ranking said binary numbers, discarding those binary numbers which fall below a predetermined threshold and generating a binary word including one bit for each said frequency component, the bits of said binary word corresponding to the X largest numbers, where X is a predetermined integer, being set.

8. Speech recognition apparatus as recited in claim 7 wherein said means for decoding, said means for storing, and said means for comparing comprise a preprogrammed microprocessor.

9. Signal recognition apparatus for recognizing data contained in an analog electrical signal comprising:
   preprocessing means for converting a segment of the analog signal into a predetermined number of digital signals, each representing the amplitude of a portion of said segment;
   spectrum analyzing means for receiving said digital signals and for determining the frequency content of the signal segment represented by said digital signals and for developing a series of frequency component signals each corresponding to the relative magnitude of a particular frequency component of said segment;
   means for converting said series of frequency component signals into an input sonogram comprised of a number of data bits corresponding to said frequency component signals and indicating the presence or absence of component frequencies of significant amplitude;
   means for concatenating a plurality of said sonograms and for using an $n$-tuple pattern generating technique to convert the concatenated sonograms into an $n$-tuple input binary word;
   means for comparing said input binary word with each of a predetermined number of previously stored binary words and for developing an output signal when a predetermined number of bits of said input binary word correspond with a like number of bits of one of said stored binary words; and
   means responsive to said output signal for indicating recognition of the data.

10. Signal recognition apparatus as recited in claim 9 wherein said preprocessing means includes an analog-to-digital converter which periodically samples said analog signal to develop said digital signals, and buffer means for storing each said digit signal in said segment.

11. Signal recognition apparatus as recited in claim 10 wherein said spectrum analyzing means includes means for receiving the digital signals stored in said buffer means and corresponding to said first segment, and for repetitively outputting said signals at predetermined different rates during the time that digital signals from a second segment are being loaded into said buffer means; digital-to-analog means for converting the time shifted digital signals to corresponding analog signals; and band pass filter means for filtering out a particular frequency component from each of the time shifted analog signals to develop said series of frequency component signals.

12. Signal recognition apparatus as recited in claim 11 wherein said spectrum analyzing means further includes averaging circuit means for normalizing said frequency component signals.

13. Signal recognition apparatus as recited in claim 12 wherein said means for converting said series of frequency component signals includes an analog-to-binary digital converter which is representative of the amplitude of one of said frequency component signals, and means for ranking said binary numbers, discarding those binary numbers which fall below a predetermined threshold and generating a binary word including one bit for each frequency component, the bits of said binary word corresponding to the X largest numbers, where X is a predetermined integer, being set.

14. Signal recognition apparatus as recited in claim 13 wherein said means for concatenating, and said means for comparing comprise a preprogrammed microprocessor.

15. A speech recognition method comprising;
   converting a voice signal into a corresponding analog electrical signal;
   separating said analog signal into time slices of signal;
   analyzing each said time slice for frequency content to develop a sonogram comprised of a series of digital characters each of which corresponds to the relative magnitude of a particular frequency component of the time slice;
   accumulating a plurality of said sonograms;
   using an $n$-tuple technique to develop a word pattern from said accumulated sonograms;
   comparing said word pattern to each of a plurality of previously stored word patterns, each time counting the number of bits in the compared patterns; and
   generating a recognition indication when the number of matched bits satisfies a predetermined criteria.

16. A speech recognition method as recited in claim 15 wherein said analyzing step includes sampling each said time slice of signal a plurality of times to develop a series of digital signals representative of the amplitude of each sample; outputting said series of digital signals a predetermined number of times at different rates; converting each read out series of digital signals to a time-shifted analog signal; and filtering each said time-shifted signal through a signal band pass filter to develop a series of frequency component signals from which said sonograms are developed.

17. A speech recognition method as recited in claim 16 wherein the step of utilizing said $n$-tuple technique includes pseudo-randomly selecting various ones of said digital characters from said accumulated sonograms, combining the selected digital characters into groups of $n$ data bits, where $n$ is an integer, and decoding each of said groups of said $n$ bits to develop a corresponding binary word of length $2^n$.

18. A speech recognition method as recited in claim 15 wherein said predetermined criteria is the requirement that the count of matched bits of the highest count exceed a predetermined minimum value and differ from the next highest count by a predetermined number of counts.

* * * * *

UNITED STATES PATENT OFFICE
CERTIFICATE OF CORRECTION

Patent No. 4,087,630                     Dated  May 2, 1978

Inventor(s) Iben Browning et al.

It is certified that error appears in the above-identified patent and that said Letters Patent are hereby corrected as shown below:

Cancel Figures 3 and 5 of the drawings and substitute the corrected Figures as shown on the attached sheets.

Signed and Sealed this

Twelfth Day of September 1978

[SEAL]

Attest:

RUTH C. MASON
*Attesting Officer*

DONALD W. BANNER
*Commissioner of Patents and Trademarks*

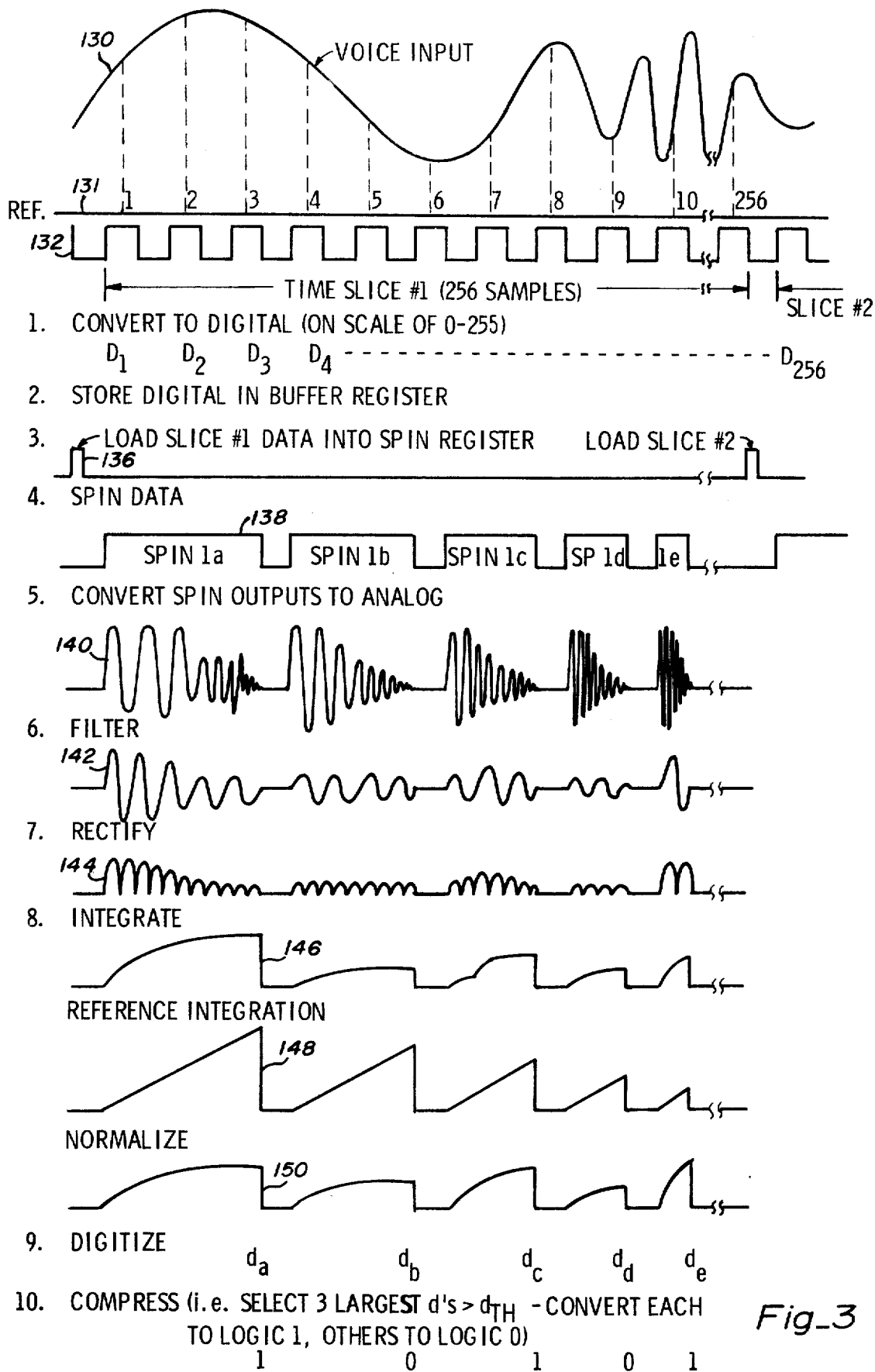
Fig_3

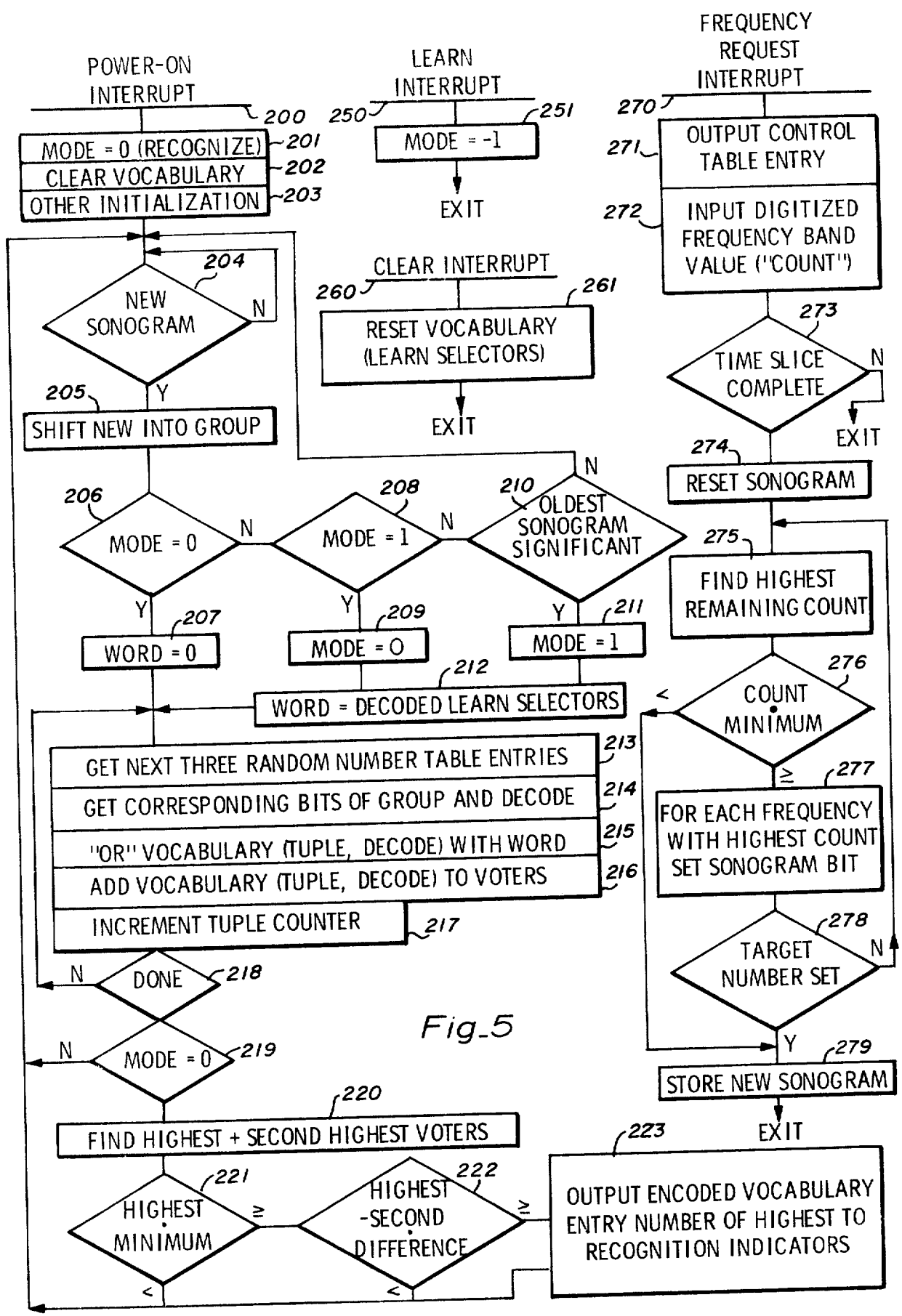
Fig_5

UNITED STATES PATENT OFFICE
CERTIFICATE OF CORRECTION

Patent No. 4,087,630                    Dated May 2, 1978

Inventor(s)  Iben Browning, et al.

It is certified that error appears in the above-identified patent and that said Letters Patent are hereby corrected as shown below:

Column 14, line 1, after "which" insert --develops a series of binary numbers, each of which--.

Signed and Sealed this

Sixth Day of November 1979

[SEAL]

Attest:

RUTH C. MASON
*Attesting Officer*

LUTRELLE F. PARKER
*Acting Commissioner of Patents and Trademarks*